(Model.)
W. W. BOYINGTON.
SASH CORD GUIDE.
No. 290,203. Patented Dec. 18, 1883.
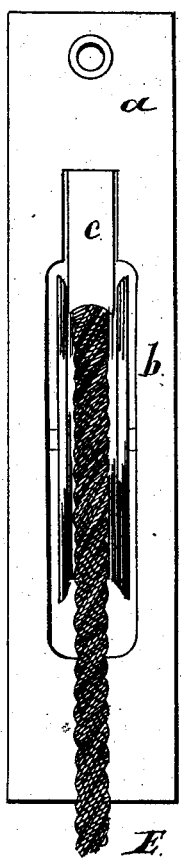
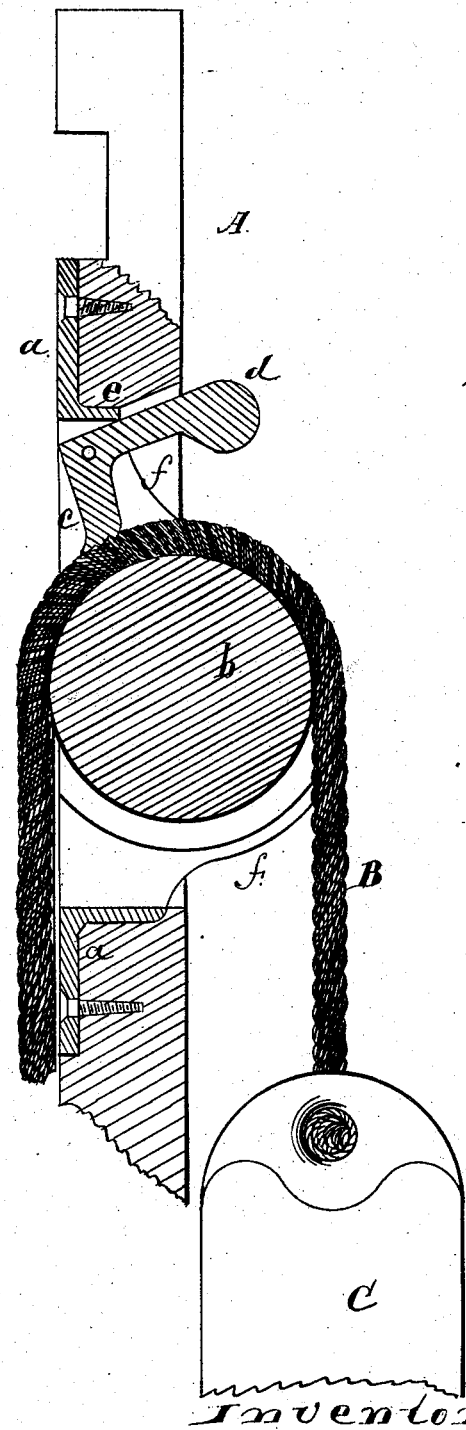
Witnesses:
O. W. Bond
E. I. Bond
Inventor:
William W. Boyington

UNITED STATES PATENT OFFICE.

WILLIAM W. BOYINGTON, OF HIGHLAND PARK, ILLINOIS.

SASH-CORD GUIDE.

SPECIFICATION forming part of Letters Patent No. 290,20?, dated December 18, 1883.

Application filed June 11, 1883. (Model.)

*To all whom it may concern:*

Be it known that I, WILLIAM W. BOYINGTON, residing at Highland Park, in the county of Lake and State of Illinois, and a citizen of the United States, have invented a new and useful Improvement in Devices for Holding Sash-Weights at Different Elevations, of which the following is a full description, reference being had to the accompanying drawings, in which—

Figure 1 is a side elevation of a side jamb of a window-frame, partly in section, also showing a vertical section of the hanger; Fig. 2, an elevation of the face-plate.

The object of this invention is to so construct a hanger or device for supporting sash-weights as that the cord may be held or fastened at any elevation; and the device is more particularly designed to be used in connection with detachable cord-fasteners, so that when the cord is detached from the sash it will not be pulled back out of reach by the descent of the weight; and the invention consists in the novel construction and combination of parts hereinafter described and claimed.

In the drawings, A represents a side jamb of a window-frame; B, sash-cord; C, weight; $a$, face-plate of the hanger; $b$, roller or wheel; $c$, dog; $d$, weighted arm of dog; $e$, stop or projection to prevent the dog from passing back out of action, and $f$ side plates of the hanger. The frame A, of which a part only is shown, is of the usual construction, and the cord B and weight C are also of the usual construction. The hanger $a$ is provided with side plates or wings, $f$, into which the roller $b$ is journaled, and to which the dog $c$ is pivoted. This casing $a f$ is, by preference, made of brass, but it may be made of malleable cast-iron, sheet metal, or of other suitable material. The wheel $b$ is usually made of malleable cast-iron, and the dog $c$ of brass; but either may be made of any other suitable metal or material. The roller $b$ varies considerably in size, one of the large size being shown; but whatever size is used its pivots or bearings are adjusted to bring it with its cord into proper relation with the dog $c$. The dog $c$ is pivoted, as shown in Fig. 1, and its lower end is, by preference, somewhat roughened, as there shown, to insure its taking a strong hold of the rope. The casing $a f$ of the hanger is provided with a stop, $e$, which prevents the arm $d$ of the dog from rising so far as to permit the dog $c$ to pass so far back as to be thrown out of use, by reason of its passing behind the center or pivot of the roller $b$, and the dog may be prevented from coming in contact with the sash by furnishing the device with another or additional limit-stop, to regulate the descent of the arm $d$. As shown, the the arm $d$ is weighted at its outer end, and I prefer this form, but a spring may be used instead of the weight, as the purpose of the weight or spring is to keep the dog out of contact with the rope in the ordinary movement or use of the sash, and to assist in releasing it after it has been thrown into use. When used in connection with a detachable cord-fastener, its operation is as follows: The cord B, either before or after it is released from the sash, is pulled down, so as to bring the weight to the desired elevation, or to give the desired length of cord for manipulation. The cord is then slightly straightened out or lifted, so as to bring it in contact with the dog $c$, when by ceasing the grip, so as to let the weight act, the cord will be gripped or pinched, so as to hold it between the dog and the roller. When it is desired to release the dog, a downward pull in the direction in which the inner end of the cord is shown in Fig. 1 is given, and by its movement and by the weight of the arm $d$ throws the dog out of contact, where it will remain until the cord is again lifted to bring it in contact, or until the dog $c$ is pushed in by hand. This arrangement makes a very desirable hanger to be used in connection with detachable cord-fasteners or other device used for the purpose of permitting a removal of the sash for cleaning or other purpose; but its use is not confined or limited to a connection with sash-cords detachably attached. It is useful for all methods of hanging sash-weights.

What I claim as new, and desire to secure by Letters Patent, is as follows:

1. The hanger $a$, having side plates, $f$, and